United States Patent
Kalwa et al.

(10) Patent No.: US 11,612,911 B2
(45) Date of Patent: Mar. 28, 2023

(54) METHOD FOR PRODUCING A MATT SUPPORT MATERIAL PROVIDED WITH AN ANTI-FINGERPRINT COATING

(71) Applicant: Flooring Technologies Ltd., Ricasoli (MT)

(72) Inventors: Norbert Kalwa, Horn-Bad Meinberg (DE); Joachim Hasch, Berlin (DE); Bernd Stiewe, Nieheim (DE)

(73) Assignee: Flooring Technologies Ltd., Kalkara (MT)

( * ) Notice: Subject to any disclaimer, the term of this patent is extended or adjusted under 35 U.S.C. 154(b) by 0 days.

(21) Appl. No.: 17/610,872

(22) PCT Filed: May 6, 2020

(86) PCT No.: PCT/EP2020/062603
§ 371 (c)(1),
(2) Date: Nov. 12, 2021

(87) PCT Pub. No.: WO2020/229267
PCT Pub. Date: Nov. 19, 2020

(65) Prior Publication Data
US 2022/0212229 A1   Jul. 7, 2022

(30) Foreign Application Priority Data

May 13, 2019 (EP) .................................... 19174108

(51) Int. Cl.
| | | |
|---|---|---|
| B05D 5/02 | (2006.01) | |
| B05D 1/06 | (2006.01) | |
| B05D 3/02 | (2006.01) | |
| B05D 7/08 | (2006.01) | |
| B44C 5/04 | (2006.01) | |
| B05D 1/30 | (2006.01) | |
| B05D 3/12 | (2006.01) | |
| B05D 7/00 | (2006.01) | |

(52) U.S. Cl.
CPC ................ B05D 5/02 (2013.01); B05D 1/06 (2013.01); B05D 1/30 (2013.01); B05D 3/0263 (2013.01); B05D 3/12 (2013.01); B05D 7/08 (2013.01); B05D 7/576 (2013.01); B44C 5/043 (2013.01); B44C 5/0407 (2013.01); B44C 5/0476 (2013.01)

(58) Field of Classification Search
CPC .............. B05D 5/02; B05D 1/06; B05D 1/30; B05D 3/0263; B05D 3/12; B05D 7/08; B05D 7/576; B44C 5/0407; B44C 5/043; B44C 5/0476
See application file for complete search history.

(56) References Cited

U.S. PATENT DOCUMENTS

| | | | |
|---|---|---|---|
| 7,507,440 B2 * | 3/2009 | Reising ................. | B05D 7/576 427/407.1 |
| 8,512,804 B2 | 8/2013 | Oldorff | |
| 10,017,950 B2 | 7/2018 | Pervan | |
| 11,059,071 B2 | 7/2021 | Oldorff | |
| 2004/0219334 A1 * | 11/2004 | Watts, Jr. ................. | B44B 5/00 428/203 |
| 2011/0059238 A1 * | 3/2011 | Nasatti ...................... | B44C 5/04 427/314 |
| 2013/0273244 A1 | 10/2013 | Vetter et al. | |
| 2014/0186610 A1 * | 7/2014 | Pervan .................. | E04F 15/107 428/292.4 |
| 2018/0194123 A1 | 7/2018 | Kalwa | |
| 2019/0077138 A1 * | 3/2019 | Ma .......................... | B32B 27/36 |
| 2019/0160859 A1 | 5/2019 | Kalwa et al. | |
| 2020/0139400 A1 * | 5/2020 | McCormick ............ | B05D 7/06 |

FOREIGN PATENT DOCUMENTS

| | | | | |
|---|---|---|---|---|
| CN | 102414032 | A | 4/2012 | |
| CN | 109153283 | A | 1/2019 | |
| DE | 10334008 | A1 | 2/2005 | |
| EP | 2338693 | A1 | 6/2011 | |
| EP | 2808462 | A1 | 12/2014 | |
| EP | 3351402 | A1 | 7/2018 | |
| EP | 3686028 | A1 | 7/2020 | |
| EP | 3760403 | A1 * | 1/2021 | ............. B27N 1/006 |
| ES | 2787351 | T3 * | 10/2020 | ............... B05D 1/12 |
| JP | H10130568 | A | 5/1998 | |
| WO | 2010121971 | A2 | 10/2010 | |
| WO | 2013032387 | A1 | 3/2013 | |
| WO | 2015197171 | A1 | 12/2015 | |
| WO | 2017009011 | A1 | 1/2017 | |
| WO | 2017111689 | A1 | 6/2017 | |
| WO | 2020151949 | A1 | 7/2020 | |

* cited by examiner

*Primary Examiner* — William P Fletcher, III
(74) *Attorney, Agent, or Firm* — The Webb Law Firm

(57) ABSTRACT

It is provided a method for producing a support material provided with at least one anti-fingerprint coating including the steps of: applying at least one layer of at least one powdered resin to at least one side of the support material; melting on the at least one applied layer of the one powdered resin; applying at least one acrylate-containing dispersion to the melted-on resin layer; and drying and curing the layered structure.

27 Claims, No Drawings

METHOD FOR PRODUCING A MATT SUPPORT MATERIAL PROVIDED WITH AN ANTI-FINGERPRINT COATING

CROSS-REFERENCE TO RELATED APPLICATIONS

This application is the United States national phase of International Application No. PCT/EP2020/062603 filed May 6, 2020, and claims priority to European Patent Application No. 19174108.1 filed May 13, 2019, the disclosures of which are hereby incorporated by reference in their entirety.

BACKGROUND OF THE INVENTION

Field of the Invention

The disclosure relates to a method for producing a matt support material provided with at least one anti-fingerprint coating, in particular a wood-based panel or a paper layer provided with a decor.

Description of Related Art

The use of wood-based panels in the furniture industry, as flooring or also for cladding walls and ceilings requires processing or finishing of the surface of the wood-based panels. In the case of the above-mentioned applications, the wood-based panels are usually coated with an impregnated decorative paper. There are no limits to the variety of differently patterned decorative papers, so that wood-based panels are available with a large number of different decors, such as stone or wood decors. Overlays are applied to the decor paper to increase wear resistance. Overlays are thin, transparent papers which have typically already been impregnated with a melamine resin. Overlays are also available in which abrasion-resistant particles, such as corundum particles, are already mixed into the resin of the overlay in order to increase the abrasion resistance of the laminate or wood-based panel.

As an alternative to the use of decorative papers on wood-based panels, direct printing on wood-based panels has developed in the past, since printing on paper and its subsequent lamination or direct coating on the wood-based panel is no longer necessary.

Several liquid thermosetting resin layers, which may contain abrasion-resistant particles to increase wear resistance, are then applied to the decor applied by direct printing. Such a thermosetting resin layer is also referred to as a liquid overlay. The thermosetting resin is preferably a formaldehyde-containing resin, in particular a melamine-formaldehyde resin and/or melamine-urea-formaldehyde resin. A process for producing the described liquid overlay layer is described, inter alia, in EP 233 86 93 A1. In this process, after cleaning the surface of a wood-based panel, a first resin layer containing upper corundum particles is first applied to the wood-based panel, this first resin layer is dried, for example, to a residual moisture content of 6 to 10%, a second resin layer containing cellulose fibers is then applied to the wood-based panel, and the second resin layer is repeatedly dried or allowed to dry. drying of the second resin layer, e.g. to a residual moisture of 6 to 10%, application of a resin layer containing at least third glass particles to the wood-based panel with subsequent drying of the third resin layer, e.g. also to a residual moisture of 4 to 8%, and final pressing of the layer structure under the influence of pressure and temperature. By using a liquid overlay, the otherwise typically provided overlay paper can be omitted. The liquid overlay can be applied to both the top and the bottom of the wood-based panel.

The disadvantage of using a liquid overlay is the amount of equipment required and the associated space requirements. In particular, the drying steps after each resin application require the use of convection dryers and the necessary exhaust air treatment.

In addition to the issue of providing the resin layer, the issue of surface design and surface structuring of these products is also important. This applies in particular to the use of printed wood-based panels for interior furnishings such as furniture, the surfaces of which are subject to high levels of stress due to touching, cleaning etc. In this context, it is often the case that a particularly good visual assessment is possible due to the surface design and lighting conditions. A very striking example of this are high-gloss fronts in kitchens. Especially when these fronts are touched, fingerprints can often be seen. This is especially true when melamine surfaces are involved. These are apparently particularly predestined to show fingerprints after being touched. The marking of fingerprints means that the surfaces have to be cleaned frequently, which is by no means desirable. However, it should be noted that melamine surfaces have a very high mechanical and chemical resistance, which gives them a clear advantage over thermoplastic films or lacquers. In addition, almost any surface finish can be produced by etching the press plates used in the manufacture of melamine coated wood-based panels. As noted above, surface finish is an important aspect of products. As with almost all products, this is subject to fashion trends.

Whereas a few years ago high gloss was very popular as a surface finish for many products, now people are more interested in matt surfaces. Even with these surfaces, fingerprints are of course undesirable after touching or are considered a defect.

SUMMARY OF THE INVENTION

The solution is therefore based on the technical problem of providing surfaces which have a low gloss level and at the same time are clearly insensitive with respect to the visibility of fingerprints. At the same time, the manufacture of these products is to be made possible in a space-saving and cost-effective manner. The aim is also to achieve high abrasion values, especially in abrasion classes AC4 to AC6, while at the same time keeping wear on the press plate to a minimum.

This object is solved by a method having features as described herein.

Accordingly, there is provided a method for producing a wood-based panel provided with a decor, the method comprising the steps of:

applying at least one layer of at least one powdered resin to at least one side of the support material;

melting-on the at least one applied layer of the one powdered resin;

applying at least one acrylate-containing dispersion to the melted-on resin layer; and drying and hardening of the layered structure.

Accordingly, a multi-stage process is provided in which a resin powder, for example a melamine resin powder, is first applied to a carrier material, such as a paper layer or a wood-based panel, and is tempered or melted. Thereafter, an aqueous acrylic dispersion is applied, for example using a slot die, dried and then cured, for example using an excimer emitter in the surface. This paper impregnate or coated wood-based panel can then be pressed in a short-cycle press.

The present method offers various advantages. For example, a matte surface with gloss points of less than 10, preferably less than 8, more preferably less than 5 can be produced. The treated surface exhibits anti-fingerprint properties and requires little cleaning effort compared to conventional surfaces.

In addition, a process for the production of wood-based panels is provided in which the use of liquid resin for the layer structure is dispensed with and resin powder is used instead. By substituting resin powder for the liquid resin typically used, the complex drying process required for liquid overlays is eliminated, thereby reducing equipment costs, exhaust air issues and space requirements. Overall, the present process allows for a more flexible technology.

DETAILED DESCRIPTION OF THE PREFERRED EMBODIMENTS

In one embodiment of the present method, it is provided that the acrylate dispersion comprises radiation-curable acrylate-containing varnishes. Such radiation-curable lacquers may be (meth)acrylates, such as polyether (meth) acrylates, polyether (meth)acrylates, epoxy (meth)acrylates or urethane (meth)acrylates. It is also conceivable that the acrylate used or the acrylate-containing varnish is substituted or unsubstituted monomers, oligomers and/or polymers, in particular in the form of acrylic acid, acrylic ether and/or acrylic acid ester monomers, oligomers or polymers. Of importance to the present method is the presence, as defined, of a double bond or unsaturated group in the acrylate molecule. The polyacrylates may further be functionalized. Suitable functional groups include, but are not limited to, hydroxy, amino, epoxy and/or carboxyl groups. As mentioned, said acrylates allow crosslinking in the presence of UV or electron beams in the curing or drying process.

The amount of the acrylate-containing dispersion applied is between 30 and 50 g fl./m$^2$, preferably between 30 and 40 fl./m$^2$. The solids content of the acrylate-containing dispersion is between 40 and 60% by weight, preferably 50% by weight.

After application, the at least one acrylate-containing dispersion is first dried, for example by means of an IR radiator, and then cured using a UV radiator at wavelengths between 120 and 350 nm, preferably between 150 and 250 nm, in particular preferably between 170 and 200 nm (for example 172 nm), under inert gas. Preferably, not the entire acrylate layer is cured but only a layer of 0.1-0.5 nm. This corresponds to approx. 1 mg/m.

Possible inert gases are nitrogen, argon, krypton, fluorine, xenon, KrCl, ArF, KRF, XeBr, XeCl, XeF, the use of nitrogen being particularly preferred.

In another embodiment of the present method, the at least one support material is in the form of a paper layer, preferably a decorative paper layer or an overlay paper layer.

In the case of using a paper layer as a support material, the present method comprises the following steps:

applying at least one first layer of at least one powdered resin to at least one side of a paper layer and melting-on the at least one applied layer of powdered resin;
applying at least one acrylate-containing dispersion to the melted-on resin layer; and
drying and hardening of the layered structure.

A paper layer coated in this way, for example decorative paper layer or overlay paper layer, has a gloss level of less than 10, preferably less than 8, in particular preferably less than 5, and can be pressed with a carrier board, for example a wood-based material board such as MDF or HDF.

In another embodiment, a wood-based panel, preferably a medium-density fiber (MDF), high-density fiber (HDF) or oriented strand board (OSB), a plywood panel or a wood-plastic composite (WPC) panel or a stone-plastic composite (SPC) panel is used as the support material.

In a more advanced embodiment, the present method therefore comprises the following steps:

applying at least one first layer of at least one powdered resin to at least one side of the support material, in particular a wood-based panel, and melting-on the at least one applied layer of powdered resin;
applying at least one decorative layer to the at least one melted-on resin layer by a direct printing method;
applying at least one further, second layer of at least one powdered resin to the at least one printed decorative layer;
melting-on the at least one layer of the one powdered resin deposited on the decorative layer;
applying at least one acrylate-containing dispersion to the melted-on resin layer; and
drying and hardening of the layered structure.

In one embodiment of the present method, the powdered resin is applied to the substrate in an amount of 10 to 100 g/m$^2$, preferably 20 to 80 g/m$^2$, more preferably 25 to 70 g/m$^2$. This application amount of powdered resin applies substantially to all the layers of powdered resin to be applied, although these may be adjusted in each case. The spreading density is selected such that covering layers are produced in each case.

The particle size of the powdered resin is between 20 to 100 μm, preferably between 40 and 80 μm.

In another embodiment of the present method, the powdered resin to be applied is a formaldehyde resin, preferably a urea resin or a melamine resin, more preferably a melamine-formaldehyde resin. It is preferred if a melamine resin or a urea resin is used for the first resin layer. Preferably, only melamine resin is used in the upper layers.

"Melting-on" or "gelation" in the sense of the present application means that the resin layer is not yet completely polymerized, but rather the polymerization is stopped at an intermediate stage in which further crosslinking or polymerization is still possible at a later processing time. The purpose of "gelling" is thus usually to apply further functional layers to the already applied protective layer at a later time or to finish the product in further processing steps.

Other substances can also be added to the melamine resin powder. It is particularly advantageous that substances which are poorly compatible with liquid melamine resin, e.g. because of salting-out, thickening, settling, curing effects, etc., can also be used. These may be salts to increase conductivity, organic or inorganic flame retardants, cellulose derivatives, radical scavengers, pigments, UV absorbers, etc.

Accordingly, the powdered resin used may contain additives such as pigments, conductive substances and cellulose.

When colour pigments are added, the layer of melted resin powder can simultaneously serve as a white undercoat layer for a decorative layer to be subsequently printed on. White pigments such as titanium dioxide (TiO$_2$) can be used as color pigments. Other color pigments may be calcium carbonate, barium sulfate or barium carbonate. The amount of color pigments may be up to 50% by weight of the total amount of powder.

The addition of colour pigments to the first layer of resin powder increases the opacity, so that this can be used as a (sole) base or undercoat for the subsequent decorative layer.

The amount of cellulose fibers applied with the resin powder may be between 0.1 and 1 wt %, preferably between 0.5 and 0.8 wt % (based on the amount of resin to be applied) or between 0.1-0.5 g/m$^2$, preferably 0.2-0.4 g/m$^2$, more preferably 0.25 g/m$^2$. The cellulose fibers preferably used are colorless and are in the form of a fine or granular, slightly hygroscopic powder.

The conductive substances can be selected from the group comprising carbon black, carbon fibres, metal powder and nanoparticles, in particular carbon nanotubes. Combinations of these substances may also be used.

The resins used each preferably contain additives, such as hardeners, wetting agents (surfactants or mixtures thereof), release agents and/or other components.

In a preferred embodiment, the resin powder is applied by electrostatic charging. The application can also be carried out by means of powder coating according to the tribo method. In this case, the powder to be applied is frictionally charged.

The melting of the applied layer of powdered resin can be carried out using an IR radiator, or microwave systems or the like. The use of IR emitters is particularly preferred.

In one embodiment, the surface of the substrate, in particular in the case of a wood-based panel, may be pre-treated before printing to improve the adhesion of the subsequent layers. This can be a cleaning with brushes, a sanding which also frees the surface from unevenness, and/or a plasma or corona treatment.

In a preferred embodiment, in a next step, at least one undercoat is applied to the (first) melted-on resin powder layer to increase opacity.

The undercoat preferably comprises casein, corn starch or soy protein and may contain inorganic color pigments and thus serve as a undercoat layer for the decorative layer to be subsequently printed.

White pigments such as titanium dioxide (TiO$_2$) can again be used as colour pigments. Further colour pigments can be calcium carbonate, barium sulphate or barium carbonate, but also iron oxide pigments (for a brownish undercoat). In addition to the color pigments and the casein, corn starch or soy protein, the undercoat may also contain water as a solvent.

The amount of liquid undercoat applied may be between 10 and 50 g/m$^2$, preferably between 15 and 30 g/m$^2$, more preferably between 20 and 25 g/m$^2$.

It is also conceivable that the undercoat comprises at least one, preferably at least two or more successively applied layers or applications (e.g. up to five applications), wherein the application amount between the layers or applications is the same or different, i.e. the application amount of each individual layer may vary.

The undercoat can be applied to the substrate, e.g. the wood-based panel, using a roller with subsequent drying. It is also possible to apply the undercoat to the substrate using digital printing. The digital printing inks used for digitally printing the undercoat are preferably based on UV inks enriched with white color pigments. However, it is also possible to use water-based digital printing inks or so-called hybrid inks. An application by means of digital printing is advantageous because the printing equipment is significantly shorter than a rolling device and thus saves space, energy and costs.

In a further embodiment of the present method, a primer layer is applied to the undercoat, preferably as a single application with subsequent drying. The primer layer is particularly useful in the case of a subsequent gravure printing process (with rollers), whereas this is not absolutely necessary when a digital printing process is used.

The amount of liquid primer applied is between 10 and 30 g/m$^2$, preferably between 15 and 20 g/m$^2$. Polyurethane-based compounds are preferably used as primers.

Gravure and digital printing processes are advantageously used as direct printing processes for printing the wood-based panel. Gravure printing is a printing technique in which the elements to be imaged are present as depressions in a printing form that is inked before printing. The ink is primarily located in the depressions and is transferred to the object to be printed, such as a substrate, due to contact pressure of the printing form and adhesion forces. When using indirect gravure printing, several printing rollers are used.

In a particularly preferred embodiment, the at least one decoration is applied to the (surface-treated and pre-coated) substrate by means of a digital printing process. In digital printing, the printed image is transferred directly from a computer to a printing machine, such as a laser printer or inkjet printer. This eliminates the use of a static printing plate. Decor printing is carried out using the inkjet principle in a single-pass process in which the entire width of the top side to be printed is covered, with the plates moving underneath the printer. However, it is also possible for the support plate to be printed to be stopped under the printer, which then passes over the surface at least once during printing.

The printing inks are grouped together in separate print head rows, and one or two rows of print heads may be provided for each color. The colors of the digital printing inks are for example black, blue, red, reddish yellow, greenish yellow, optionally CMYK can be used. The digital printing inks are optionally based on the same pigments used for analog and/or digital printing with water-based inks. The digital printing inks are preferably based on UV inks. However, it is also possible to use water-based digital printing inks or so-called hybrid inks. After printing, drying and/or irradiation of the decorative print takes place.

The printing inks are applied in an amount between 1 and 30 g/m$^2$, preferably between 3 and 20 g/m$^2$, more preferably between 3 and 15 g/m$^2$.

Together with the decor, the markings required for alignment in the press are also printed.

The further powder resin layer applied and melted onto the decorative layer preferably comprises formaldehyde resin-based powder, particularly preferably melamine-formaldehyde resin. The application amount of resin powder in this step is between 10 and 50 g/m$^2$, preferably between 20 and 40 g/m$^2$.

As already mentioned above, additives such as conductive substances or cellulose, and additives such as hardeners, wetting agents or release agents can also be added to the resin powder in this process step.

Melting-on or gelation is also preferably carried out using an IR radiator.

It is possible to feed the printed substrate material to an intermediate storage after this process step. In this case, the applied and melted resin powder layer serves as a protective layer which, on the one hand, serves to protect the printed surface in the case of intermediate storage and, on the other hand (due to the not yet fully cured resin layer), enables further processing. Particularly in the case of complex processing operations, it is necessary to decouple certain work steps for reasons of cost, technology, etc. For example, interlinked production lines may vary considerably in terms of their productivity. In this case, buffer stocks must be set up in which materials are stacked on top of each other. Furthermore, multiple runs may be necessary in a production line because order quantities etc. cannot be realized in one run. In all these cases, dried or hardened surfaces are advantageous, as they protect the printed surface in the event of intermediate storage and allow further processing.

In a more advanced embodiment, abrasion resistant particles are uniformly sprinkled on the decorative layer or the resin powder layer applied to the decorative layer.

Particles of corundum (aluminium oxides), boron carbides, silicon dioxides, silicon carbides can be used as abrasion-resistant particles. Particularly preferred are corundum particles. Preferably, these are noble corundum (white) with a high transparency, so that the optical effect of the underlying decoration is adversely affected as little as possible. Corundum has an irregular spatial shape.

The amount of scattered abrasion-resistant particles is 7 to 50 g/m$^2$, preferably 10 to 30 g/m$^2$, more preferably 15 to 25 g/m$^2$. The amount of scattered abrasion-resistant particles depends on the abrasion class to be achieved and the particle size. Thus, in the case of abrasion class AC3, the amount of abrasion-resistant particles is in the range between 10 to 15 g/m$^2$, in abrasion class AC4 between 15 to 20 g/m$^2$ and in abrasion class AC5 between 20 to 35 g/m$^2$ when using grit size F200. In the present case, the finished panels preferably have abrasion class AC4.

Abrasion-resistant particles with grain sizes in classes F180 to F240, preferably F200, are used. The grain size of class F180 covers a range of 53-90 μm, F220 from 45-75 μm, F230 34-82 μm, F240 28-70 μm (FEPA standard). In one embodiment, the abrasion resistant particles used are noble corundum white F180 to F240, preferably in a main grain size range of 53-90 μm. In a particularly preferred embodiment, corundum particles of classes F180-220 are used.

The abrasion-resistant particles must not be too fine-grained (risk of dust formation), but also not too coarse-grained. The size of the abrasion-resistant particles is thus a compromise.

In a more advanced embodiment, silanized corundum particles may be used. Typical silanizing agents are aminosilanes.

In a more advanced embodiment of the present method, at least a third layer of at least one powdered resin is applied, in particular to the layer of abrasion-resistant particles. This layer serves as a release layer for blocking the abrasion-resistant particles.

The powder resin layer applied and melted in this step, in particular on the abrasion-resistant particles, preferably comprises formaldehyde resin-based powder, more preferably melamine-formaldehyde resin. The amount of resin powder applied in this step is between 10 and 50 g/m$^2$, preferably between 20 and 40 g/m$^2$.

As already mentioned above, additives such as conductive substances or cellulose, and additives such as hardeners, wetting agents or release agents can also be added to the resin powders in this process step.

Melting-on or gelation is also preferably carried out using an IR radiator.

In a more advanced embodiment of the present method, glass beads are sprinkled, particularly on the at least one third melted-on resin powder layer. The glass beads serve as spacers between abrasion-resistant particles and subsequent pressed sheet metal. Thus, the sheet wear can be at least partially reduced.

The preferably used glass beads have a diameter of 60-120 μm, preferably 80-90 μm. The diameter of the glass beads is matched to the average particle size of the abrasion-resistant particles used in order to ensure optimum blocking to the downstream pressed sheet. Thus, in the case of corundum F220, glass beads with a diameter between 70-90 μm are used, and in the case of corundum F180, glass beads with a diameter between 80-120 μm are used.

The amount of glass beads is 5 to 30 g/m$^2$, preferably 8 to 20 g/m$^2$, more preferably 8 to 15 g/m$^2$.

The glass beads may also be in silanized form. Silanization of the glass beads improves the embedding of the glass beads in the resin matrix.

In a more advanced embodiment of the present method, at least one further, for example fourth, layer of at least one powdered resin is applied, in particular to the layer of glass spheres. This layer serves to seal off the glass spheres and as a finishing layer.

The further, fourth powder resin layer applied and fused on in this step, in particular on the glass beads, preferably comprises formaldehyde resin-based powder, particularly preferably melamine-formaldehyde resin. The amount of resin powder applied in this step is between 10 and 50 g/m$^2$, preferably between 20 and 40 g/m$^2$.

As already mentioned above, additives such as conductive substances or cellulose, and additives such as hardeners, wetting agents or release agents can also be added to the resin powders in this process step.

Melting-on or gelation is also preferably carried out using an IR radiator.

In a further embodiment of the present method, the layered structure is pressed in a short-cycle press (KT press). The pressing step is carried out under the influence of pressure and temperature at temperatures between 180 and 250° C., preferably between 200 and 230° C., more preferably at 200° C. and at a pressure between 30 and 60 kg/cm$^2$, more preferably between 40 and 50 kg/cm$^2$. The pressing time is between 8 and 30 sec, preferably between 10 and 25 sec.

Preferably, the coated substrate material, such as the coated wood-based panel, is aligned in the short-cycle press with respect to a structured press plate located in the short-cycle press by means of markings on the wood-based panel, so that congruence is produced between the decor on the wood-based panel and the structure of the press plate to be imprinted. This enables the production of a decor-synchronous structure. During pressing, the melamine resin layers melt and a laminate is formed by a condensation reaction involving the corundum/glass/fibre components.

A backing layer, e.g. consisting of several resin layers without additives or a backing paper, can be applied to the underside of the wood-based panel. This ensures that the tensile forces on the wood-based panel caused by the layers applied during pressing cancel each other out. The backing layer applied to the underside corresponds in layer structure and the respective layer thickness approximately to the layer sequence applied to the upper side, but without the addition of the aggregate abrasion-resistant particles or glass beads. An impregnate can also be used as a backing layer.

In a preferred first embodiment, the present method comprises the following steps:
  applying at least one first layer of at least one powdered resin to at least one side of a wood-based panel and melting-on the at least one applied layer of powdered resin;
  applying at least one undercoat to the first melted layer of resin powder;

applying at least one primer layer on top of the at least one undercoat;

applying at least one decorative layer by means of a direct printing process;

scattering of abrasion-resistant particles;

applying at least one further layer of at least one powdered resin to the at least one layer of abrasion resistant particles and melting-on the applied layer of powdered resin;

applying, drying and curing at least one acrylate-containing dispersion to the melted-on resin layer; and pressing the layered structure.

In a preferred further embodiment, the present method comprises the following steps:

applying at least one first layer of at least one powdered resin to at least one side of a wood-based panel and melting-on the at least one applied layer of powdered resin;

applying at least one undercoat to the first melted-on layer of resin powder;

applying at least one primer layer on top of the at least one undercoat;

applying at least one decorative layer by means of a direct printing process;

applying at least one second layer of at least one powdered resin to the at least one printed decorative layer, and melting-on the at least one second layer of powdered resin applied to the decorative layer;

scattering of abrasion-resistant particles;

applying at least one further, third layer of at least one powdered resin to the at least one layer of abrasion-resistant particles, and melting-on the applied third layer of powdered resin;

scattering glass beads on the at least a third melted resin powder layer;

applying at least one further, fourth layer of at least one powdered resin to the layer of glass beads and melting the applied fourth layer of powdered resin;

applying, drying and curing at least one acrylate-containing dispersion to the melted-on resin layer; and pressing of the layered structure.

The present method thus enables the production of a wear-resistant wood-based panel provided with a decorative layer and matted, having a resin structure with abrasion-resistant particles. The present wood-based panel has a gloss level of less than 10, preferably less than 8, more preferably less than 5, for example of 3.4 or 3.8 gloss points.

The wood-based panel comprises at least one decorative layer on the upper surface and a multilayer resin structure comprising abrasion-resistant particles, optionally cellulose fibres and glass beads, the multilayer resin structure having a total layer thickness of between 60 and 200 µm, preferably between 90 and 150 µm, in particular preferably between 100 and 120 µm.

In one embodiment, the present method enables the production of an abrasion-resistant wood-based panel having the following layered structure (viewed from bottom to top): optional backing layer—wood-based panel—first resin layer of melted-on resin powder—print decor layer—second resin layer of melted-on resin powder (protective layer)—cured acrylate layer.

In a further embodiment, the present method enables the production of an abrasion-resistant wood-based panel with the following layered structure (viewed from bottom to top): optionally backing layer—wood-based panel—first resin layer of melted-on resin powder—undercoat layer—primer layer—print decor layer—layer of abrasion-resistant particles—second resin layer of melted-on resin powder (protective layer)—cured acrylate layer.

In a still further embodiment, the present method enables the production of an abrasion-resistant wood-based panel having the following layer structure (viewed from bottom to top): optional backing layer—wood-based panel—first resin layer of melted-on resin powder—undercoat layer—primer layer—print decor layer—second resin layer of melted-on resin powder (protective layer)—layer of abrasion-resistant particles—third resin layer of melted-on resin powder (release layer)—glass beads (spacers)—fourth resin layer of melted-on resin powder—cured acrylic layer.

The protective layer serves to cover the decor and protect the decor during intermediate storage (stacking, storage, transport). The other resin layers on the top side together form an overlay that protects the finished laminate against abrasion and enables decor-synchronous structuring.

The production line for carrying out the present method includes the following elements:

at least one application device for applying a resin powder layer, which may contain fibers, to the upper surface of the substrate;

at least one device for melting the first resin powder layer, in particular an IR emitter;

at least one application device for applying at least one acrylate-containing dispersion to the melted-on resin layer, and at least one device for curing the acrylate-containing layer, in particular a UV lamp.

In one embodiment, the present production line comprises the following elements:

at least one application device for applying a first resin powder layer, which may contain fibres, to the upper surface of a wood-based panel as a support material, and at least one device for melting-on the first resin powder layer, in particular an IR emitter;

opt. at least one application device for applying at least one undercoat layer;

opt. at least one application device for applying at least one primer layer;

at least one printing device, opt. at least one application device for applying a further resin powder layer and at least one device for melting-on the resin powder layer, in particular an IR emitter;

opt. at least one device for scattering a predetermined quantity of abrasion-resistant particles;

opt. at least one application device for applying a further resin powder layer and at least one device for melting-on the resin powder layer, in particular an IR emitter;

opt. at least one device for scattering a predetermined quantity of glass beads;

opt at least one application device for applying a further resin powder layer and at least one device for melting-on the first resin powder layer, in particular an IR emitter;

at least one application device for applying at least one acrylate-containing dispersion to the melted-on resin layer, and at least one device for drying and curing the acrylate-containing layer, in particular a UV radiator, and opt. at least one short-cycle press.

Tribo guns may be used as the devices provided in the present production line for applying the resin powder layers.

The scattering device provided in the present production line for the abrasion resistant particles and glass beads is suitable for scattering powders, granules, fibers and comprises an oscillating brush system. The scattering device essentially comprises a hopper, a rotating structured roller and a scraper. In this regard, the rotational speed of the roller is used to determine the amount of abrasion resistant material applied. The scattering device preferably comprises a spiked roller.

In one embodiment of the present production line, it is further provided that the at least one scattering device is surrounded by or arranged in at least one cabin provided with at least one means for removing dusts occurring in the cabin. The means for removing the dusts may be in the form of a suction device or may be in the form of a device for blowing in air. The blowing in of air may be achieved via nozzles installed at the panel inlet and outlet, which blow air into the booth. In addition, these can prevent an inhomogeneous scattering curtain of abrasion-resistant material from being created by air movements.

The removal of the dust of abrasion-resistant material from the environment of the scattering device is advantageous, because apart from the obvious health burden for the workers on the production line, the fine dust of abrasion-resistant particles is also deposited on other equipment parts of the production line and leads to increased wear of the same. The arrangement of the scattering device in a cabin therefore not only serves to reduce the health-related dust pollution of the environment of the production line, but also prevents premature wear.

The scattering device is preferably controlled by a light barrier, whereby the light barrier is arranged in the processing direction in front of the roller (spreading roller) provided below the scattering device. The control of the scattering device by a light barrier is useful, because there are more or less large gaps between the individual wood material boards, which starts the scattering process as soon as a board is in front of the scattering roller.

In one embodiment of the present scattering device, at least one hopper is provided in front of the scattering roller for collecting excess abrasion-resistant particles (i.e., abrasion-resistant particles not spread on the at least one wood-based panel, but rather falling down in front of the wood-based panel before the wood-based panel is moved in by means of the transport device under the scattering roller).

In a more advanced embodiment, the hopper is coupled to at least one conveyor and a screening device, wherein the excess abrasion resistant material collected in the hopper is transported to the screening device via the conveyor. The screen mesh of the screening device corresponds to the largest used grain of the abrasion resistant particulate material (i.e., about 80-100 microns). In the screening device, dirt particles and clumped material (such as clumped resin or clumped abrasion resistant material) are separated from the collected abrasion resistant material and the screened abrasion resistant material can be returned (recycled) to the spreading device.

As already explained above, it is also envisaged to add the hardener to the liquid resin in a targeted manner at the corresponding application units or application devices for the various resin layers. In one embodiment of the present production line, at least one metering unit for adding the hardener at each application device is provided for this purpose. The hardener is pumped from the at least one dosing unit into the template container for the resin and is mixed in the template container with the resin, for example by means of a suitable agitator.

The solution is explained in more detail below with reference to several embodiments.

EXAMPLE 1

In a production line operated at a feed rate of 25 m/min, decorative paper (grammage: 80 g/m$^2$) is unwound from a roll. In an application device, the decorative paper is then coated on the top side with melamine resin powder in a quantity of 70 g/m$^2$ using tribo guns. The melamine resin powder contained the usual additives such as hardeners, release agents, etc. The powder is then melted-on by infrared radiation.

An acrylic dispersion is then applied to the top surface with a slot nozzle in a quantity of 30 g fl./m$^2$ (solids content: approx. 50% by weight). The dispersion is dried with the help of IR radiators. Afterwards the surface is hardened with the help of an excimer radiator (172 nm) under inert gas (nitrogen).

The impregnate is then pressed on the top side on a carrier in a short-cycle press. On the reverse side, a decorative impregnate without acrylate coating was used. A 19 mm chipboard was used as the carrier. The pressing conditions were: T=200° C., p=40 kg/cm$^2$ and t=16 sec. A press plate with a deckle structure was used.

After pressing, a gloss level determination (DIN EN ISO 2813:2015-02, measuring angle: 85°) was performed, resulting in a value of 3.8 gloss points.

An impregnate that had been impregnated without an acrylate coating yielded a value of 12.3 gloss points in the gloss level determination.

On the surface as well as the reference surface, several fingerprints were applied by a test person—as far as possible. In contrast to the reference surface, this was not possible on the surface with the test formulation.

EXAMPLE 2

In a production line, which is operated at a feed rate of 25 m/min, overlay paper (grammage: 30 g/m$^2$) is unwound from a roll. In a spreader 20 g corundum/m$^2$ (F230, FEPA standard) are spread. In an application device, the overlay paper is then coated on the top side with melamine resin powder in a quantity of 20 g/m$^2$ using tribo guns. The melamine resin powder contained the usual additives such as hardeners, release agents, etc. Afterwards the powder is melted by infrared radiation.

Subsequently, melamine resin powder in a quantity of 80 g/m$^2$ is applied to the reverse side, also with an application device, which again works with tribo guns, and annealed with IR radiators. The melamine resin powder contained the usual additives such as hardeners, release agents, etc.

An acrylic dispersion is then applied to this melamine resin (on the underside) with a slot nozzle in a quantity of 30 g fl./m$^2$ (solids content: approx. 50% by weight). The dispersion is dried with the help of IR radiators. Afterwards the surface is hardened with the help of an excimer radiator (172 nm) under inert gas.

Then, the overlay impregnate with the acrylic coating facing up is pressed onto a 7 mm HDF in a short-cycle press on a decorative impregnate on the top side and a backing on the bottom side. The pressing conditions were: T=200° C., p=40 kg/cm$^2$ and t=16 sec. A press plate with a deckle structure was used.

After pressing, a gloss level determination (DIN EN ISO 2813:2015-02, measuring angle:)85° was carried out, resulting in a value of 3.8 gloss points. As a reference, a pressing with an overlay impregnate, which had been produced without an acrylate coating, provided a value of 12.3 gloss points in the gloss level determination.

On the surface as well as the reference surface, several fingerprints were applied by a test person—as far as possible. In contrast to the reference surface, this was not possible on the surface with the test formulation.

The test of the behaviour against abrasion stress according to DIN EN 13329, 2016-08 resulted in a stress class 32.

EXAMPLE 3

In a production line, 8 mm HDF are separated, cleaned of dust with the help of brushes and then transported further via roller conveyors (system feed rate: 30 m/min). In an application device they are then coated with melamine resin powder in a quantity of 25 g/m$^2$ with the help of tribo guns. The melamine resin powder contained the usual auxiliary materials such as hardener, release agent, etc. The powder is then melted by infrared radiation.

The coated panel is then coated with a colour undercoat in multiple coats with subsequent intermediate drying (circulating air). The colour undercoat is a mixture of casein and pigment (titanium dioxide). The application quantity per application is approx. 5 g fl./m$^2$. The application is repeated at least five times. Afterwards a primer is applied (application quantity: 10-20 g fl./m$^2$) with circulating air drying. Afterwards the plate is printed with the help of rollers or a digital printer. The application quantities of ink are between 3 and 15 g fl./m$^2$. The ink is dried by IR radiation or circulating air. Corundum is scattered on the print with a scattering device (application quantity: 20 g corundum/m$^2$, F 230 FEPA standard). Then melamine resin powder is applied again with a tribo gun (application quantity: 60 g/m$^2$). The melamine resin powder contained the usual auxiliary materials such as hardener, release agent, etc. This melamine resin powder was again annealed with the aid of an IR radiator. The melamine resin powder contains the usual additives such as hardeners, release agents, etc.

An acrylic dispersion is then applied to this melamine resin with a slot nozzle in a quantity of 50 g fl./m$^2$ (solids content: approx. 50% by weight). The dispersion is dried with the help of IR radiators. Afterwards the surface is hardened with the help of an excimer radiator (172 nm) under inert gas.

Then the board is pressed in a KT press together with a backing-impregnate. The pressing conditions were: T=200° C., p=40 kg/cm$^2$ and t=12 sec. A press plate with a deckle structure was used. After pressing, a gloss level determination (DIN EN ISO 2813:2015-02, measuring angle: 85°) was performed, resulting in a value of 3.4 gloss points. A reference sample, which had been produced without acrylate coating, provided a value of 12.9 gloss points in the gloss level determination.

On the surface as well as the reference surface, several fingerprints were applied by a test person—as far as possible. In contrast to the reference surface, this was not possible on the surface with the test formulation.

The subsequently conducted test regarding the behaviour against abrasion stress according to DIN EN 15468-August 2018 delivered as a result the stress class 32.

EXAMPLE 4

In a production line, 8 mm HDF is separated, freed from dust with the help of brushes and then transported further via roller conveyors (feed rate: 30 m/min). In an application device, they are then coated with melamine resin powder in a quantity of 25 g/m$^2$ using tribo guns. The melamine resin powder contained the usual auxiliary materials such as hardener, release agent, etc. The powder is then melted by infrared radiation.

The coated panel is then coated with a colour undercoat in multiple coats with subsequent intermediate drying (circulating air). The colour undercoat is a mixture of casein and pigment (titanium dioxide). The application quantity per application is approx. 5 g fl./m$^2$. The application is repeated at least five times. Afterwards a primer is applied (application quantity: 10-20 g fl./m$^2$ with circulating air drying. Afterwards the plate is printed with the help of rollers or a digital printer. The application quantity of ink is between 3 and 15 g fl./m$^2$. The ink is dried by IR radiation or circulating air. Afterwards, melamine resin powder is again applied with a tribo gun (application quantity: 30 g/m$^2$). The melamine resin powder contains the usual additives such as hardeners, release agents, etc. This melamine resin powder is again gelled with the aid of an IR radiator. Corundum is sprinkled onto the print with a sprinkling device (application quantity: 20 g corundum/m$^2$, F 230; FEPA standard). Then melamine resin powder is applied again with a tribo gun (application quantity: 50 g/m$^2$). The melamine resin powder contained approx. 5 wt % cellulose (Fa. J. Rettenmaier & Söhne, Vivapur 302). The melamine resin powder contained the usual additives such as hardeners, release agents, etc. This melamine resin powder was again gelled with the aid of an IR radiator. The melamine resin powder contained the usual auxiliary materials such as hardener, release agent, etc. Then glass balls in a quantity of approx. 8 g/m$^2$ (Fa. Potters, GP 065-90) were sprinkled on with a sprinkling device. Melamine resin powder was applied again with the help of tribo guns (application quantity: 40 g/m$^2$). Here, too, the melamine resin powder contains the usual additives. The resin is again gelled with the help of an IR radiator.

An acrylic dispersion is then applied to this melamine resin with a slot nozzle in a quantity of 40 g fl./m2 (solids content: approx. 50% by weight). The dispersion is dried with the help of IR radiators. Afterwards the surface is hardened with the help of an excimer radiator (172 nm) under inert gas.

Then the board is pressed in a KT press together with a backing-impregnate. The pressing conditions were: T=200° C., p=40 kg/cm$^2$ and t=15 sec. A press plate with a deckle structure was used. After pressing, a gloss level determination (DIN EN ISO 2813:2015-02, measuring angle:) 85° was performed, resulting in a value of 3.8 gloss points. A sheet that had been manufactured without an acrylate coating yielded a value of 12.0 gloss points in the gloss level determination.

On the surface as well as the reference surface, several fingerprints were applied by a test person—as far as possible. In contrast to the reference surface, this was not possible on the surface with the test formulation.

The subsequently conducted test regarding the behaviour against abrasion stress according to DIN EN 15468-August 2018 delivered as a result the stress class 32.

EXAMPLE 5

In a production line, 8 mm HDF are separated, cleaned of dust with the help of brushes and then transported further via roller conveyors (system feed rate: 30 m/min). In an application device they are then coated with melamine resin powder in a quantity of 25 g/m$^2$ with the help of tribo guns. The melamine resin powder contained the usual auxiliary materials such as hardener, release agent etc. In addition, the resin contained 3 wt % carbon nanotubes. The powder is then melted by infrared radiation.

The coated panel is then coated with a colour undercoat in multiple coats with subsequent intermediate drying (circulating air). The colour undercoat is a mixture of casein and pigment (titanium dioxide). The application quantity per application is approx. 5 g fl./m². The application is repeated at least five times. Afterwards a primer is applied (application quantity: 10-20 g fl./m²) with circulating air drying. Afterwards the plate is printed with the help of rollers or a digital printer. The application quantities of ink are between 3 and 15 g fl./m². The ink is dried by IR radiation or circulating air. Afterwards, melamine resin powder is again applied with a tribo gun (application quantity: 30 g/m²). The melamine resin powder contained the usual auxiliary materials such as hardener, release agent, etc. This melamine resin powder is again annealed with the help of an IR radiator. Corundum is sprinkled onto the print with a sprinkling device (application quantity: 20 g corundum/m², F 230). Then melamine resin powder is applied again with a tribo gun (application quantity: 50 g/m²). The melamine resin powder contained approx. 5% by weight cellulose (J. Rettenmaier & Söhne, Vivapur 302). This melamine resin powder was again annealed with the aid of an IR radiator. The melamine resin powder contained the usual auxiliary materials such as hardener, separating agent etc. Then glass beads in a quantity of approx. 8 g/m² (Potters, GP 065-90) were sprinkled on with a sprinkling device. Melamine resin powder was applied again with the aid of tribo guns (application quantity: 40 g/m²). Here, too, the melamine resin powder contains the usual additives. The resin is again gelled with the aid of an IR radiator.

An acrylic dispersion is then applied to this melamine resin with a slot nozzle in a quantity of 40 g fl./m² (solids content: approx. 50% by weight). The dispersion is dried with the help of IR radiators. Afterwards the surface is hardened with the help of an excimer radiator (172 nm) under inert gas.

Then the board is pressed in a KT press together with a backing-impregnate. The pressing conditions were: T=200 ° C., p=40 kg/cm² and t=15 sec. A press plate with a deckle structure was used. After pressing, a gloss level determination (DIN EN ISO 2813:2015-02, measuring angle:) 85° was performed, resulting in a value of 3.8 gloss points. A sheet that had been manufactured without an acrylate coating yielded a value of 12.0 gloss points in the gloss level determination.

On the surface as well as the reference surface, several fingerprints were applied by a test person—as far as possible. In contrast to the reference surface, this was not possible on the surface with the test formulation.

The test subsequently carried out with regard to the behaviour against abrasion stress in accordance with DIN EN 15468-August 2018 delivered as a result the stress class 32. A measurement of the surface resistance resulted in a value of $7.8 \times 10^8$ Ω.

The invention claimed is:

1. A method of producing a support material having anti-fingerprint properties comprising the steps of:
   applying at least one layer of at least one powdered resin to at least one side of a substrate;
   melting-on the at least one applied layer of the at least one powdered resin;
   applying at least one acrylate-containing dispersion to the melted-on resin layer; and
   drying and hardening the layered structure.

2. The method according to claim 1, wherein the substrate is at least one paper layer.

3. The method according to claim 1, wherein the substrate is a wood-based panel.

4. The method according to claim 1, wherein the at least one powdered resin is a powdered formaldehyde resin.

5. The method according to claim 1, wherein after applying and melting-on at least one first resin layer of at least one powdered resin and before applying the at least one acrylate-containing dispersion, the method further comprises:
   applying at least one decorative layer to the at least one melted-on first resin layer by a direct printing method;
   applying the at least one second resin layer of the at least one powdered resin to the at least one decorative layer; and
   melting-on the applied at least one second resin layer resin applied to the decorative layer.

6. The method according to claim 5, wherein at least one undercoat is applied to the melted-on at least one first resin layer before applying the at least one decorative layer.

7. The method of claim 6, wherein the at least one undercoat comprises casein, corn starch or soy protein.

8. The method according to claim 6, wherein at least one primer layer is applied to the melted-on at least one first resin layer before applying the at least one undercoat.

9. The method according to claim 5, wherein at least one primer layer is applied to the melted-on at least one first resin layer before applying the at least one decorative layer.

10. The method according to claim 5, wherein abrasion-resistant particles are scattered on the decorative layer or on the melted-on at least one first resin layer and/or at least one second resin layer.

11. The method according to claim 10, wherein at least one third resin layer of at least one powdered resin is applied and melted-on after scattering of the abrasion-resistant particles.

12. The method according to claim 11, wherein glass beads are scattered on the at least one third resin layer.

13. The method according to claim 12, wherein at least one fourth resin layer of at least one powdered resin is applied to the layer of glass beads.

14. The method of claim 5, wherein the substrate is a wood-based panel.

15. The method according to claim 1, wherein the at least one acrylate-containing dispersion comprises a radiation-curable acrylate-containing varnish.

16. The method according to claim 1, wherein the at least one acrylate-containing dispersion is cured after application using a UV lamp at wavelengths between 120 and 350 nm under inert gas.

17. The method according to claim 1, wherein the dried and hardened layered structure is pressed in a short-cycle press.

18. The method of according to claim 1, wherein after applying and melting-on at least one first resin layer of at least one powdered resin and before applying the at least one acrylate-containing dispersion, the method further comprises:
   applying at least one undercoat to the melted-on at least one first resin layer;
   applying at least one primer layer on top of the at least one undercoat;
   applying at least one decorative layer by means of a direct printing process to the undercoat layer;
   applying at least one second resin layer of at least one powdered resin to the at least one decorative layer, and melting-on the at least one second resin layer applied to the at least one decorative layer;
   scattering at least one layer of abrasion-resistant particles on the second resin layer;

applying at least one third resin layer of at least one powdered resin to the at least one layer of abrasion-resistant particles, and melting-on the applied third resin layer;

scattering of a layer of glass beads on the at least one third resin layer;

applying at least one fourth resin layer of at least one powdered resin to the layer of glass beads and melting-on the applied at least one fourth resin layer;

applying at least one acrylate-containing dispersion to the fourth resin layer; and wherein after drying and hardening the at least one acrylate-containing dispersion, pressing the layered structure.

19. The method according to claim 1, wherein the substrate is a decorative paper layer or an overlay paper layer.

20. The method according to claim 1, wherein the substrate is a medium-density fiber (MDF), high-density fiber (HDF) or rough particleboard (OSB), a plywood panel, or a wood-plastic composite (WPC) panel.

21. The method according to claim 1, wherein the at least one powdered resin is applied to the substrate by electrostatic charging.

22. The method according to claim 1, wherein the powdered formaldehyde resin comprises pigments, conductive substances, and/or cellulose.

23. The method according to claim 1, wherein the at least one powdered resin is a urea resin, a melamine resin, or a phenolic resin.

24. The method according to claim 1, wherein the at least one powdered resin is a melamine-formaldehyde resin.

25. The method according to claim 1, wherein the at least one acrylate-containing dispersion is polyether (meth)acrylates, polyether (meth)acrylates, epoxy (meth)acrylates, or urethane (meth)acrylates.

26. The method according to claim 1, wherein the at least one acrylate-containing dispersion is cured after application using a UV lamp at wavelengths between 150 and 250 nm under inert gas.

27. The method according to claim 1, wherein the at least one acrylate-containing dispersion is cured after application using a UV lamp at wavelengths between 170 and 200 nm under inert gas.

* * * * *